United States Patent
Bonhomme

(10) Patent No.: US 11,916,218 B2
(45) Date of Patent: Feb. 27, 2024

(54) METHOD AND SYSTEM FOR USE OF NITROGEN AS A STABILIZATION GAS OF POLYACRYLONITRILE (PAN)

(71) Applicant: Enevate Corporation, Irvine, CA (US)

(72) Inventor: Frederic Bonhomme, Lake Forest, CA (US)

(73) Assignee: ENEVATE CORPORATION, Irvine, CA (US)

( * ) Notice: Subject to any disclaimer, the term of this patent is extended or adjusted under 35 U.S.C. 154(b) by 232 days.

(21) Appl. No.: 17/090,631

(22) Filed: Nov. 5, 2020

(65) Prior Publication Data
US 2021/0143396 A1 May 13, 2021

Related U.S. Application Data

(60) Provisional application No. 62/933,034, filed on Nov. 8, 2019.

(51) Int. Cl.
*H01M 4/04* (2006.01)
*H01M 4/38* (2006.01)
(Continued)

(52) U.S. Cl.
CPC ......... *H01M 4/0471* (2013.01); *H01M 4/386* (2013.01); *H01M 4/625* (2013.01); *H01M 4/667* (2013.01)

(58) Field of Classification Search
CPC .... H01M 4/0471; H01M 4/134; H01M 4/386; H01M 4/622; H01M 4/661; H01M 4/667; H01M 10/052; H01M 2004/027
See application file for complete search history.

(56) References Cited

U.S. PATENT DOCUMENTS

| | | | |
|---|---|---|---|
| 2012/0141888 A1* | 6/2012 | Bulan | C25B 11/031 429/405 |
| 2015/0188126 A1* | 7/2015 | Kang | H01M 4/0419 429/188 |

(Continued)

FOREIGN PATENT DOCUMENTS

WO   2016123718   8/2016

OTHER PUBLICATIONS

Notification of Transmittal of the International Search Report and the Written Opinion of the International Searching Authority, or the Declaration, International Application No. PCT/ JS20/59365; International Filing Date Nov. 6, 2020.

*Primary Examiner* — Scott J. Chmielecki
(74) *Attorney, Agent, or Firm* — McAndrews, Held & Malloy, Ltd.

(57) ABSTRACT

Systems and methods for use of nitrogen as a stabilization gas of polyacrylonitrile are disclosed and may include forming an active material layer comprising silicon particles and polyacrylonitrile (PAN), and heating the active material layer including PAN using nitrogen as a stabilization gas. The active material layer may be pyrolyzed at a temperature of 500° C. or more or between 500° C. and 750° C. The active material layer may be pyrolyzed by heating in a nitrogen gas environment or an argon gas environment. The active material layer may include 50% or more silicon by weight. The active layer may be heated at a temperature of 350° C. or more, at a temperature of 300° C. or more, or a temperature of 250° C. or more. A battery may include the electrode. The active material layer may be on a metal current collector that includes one or more of: copper, nickel, and aluminum.

21 Claims, 10 Drawing Sheets

(51) Int. Cl.
*H01M 4/62* (2006.01)
*H01M 4/66* (2006.01)

(56) References Cited

U.S. PATENT DOCUMENTS

| | | | |
|---|---|---|---|
| 2015/0188195 A1* | 7/2015 | Matsushita | H01M 10/0565 |
| | | | 29/623.5 |
| 2016/0064741 A1* | 3/2016 | Kumaraguru | H01M 8/1004 |
| | | | 427/115 |
| 2016/0248052 A1* | 8/2016 | Minamitani | H01M 50/529 |
| 2017/0373284 A1* | 12/2017 | Durstock | H01M 4/625 |
| 2018/0083263 A1* | 3/2018 | Cho | H01M 4/386 |
| 2018/0269480 A1 | 9/2018 | Kim et al. | |
| 2019/0081317 A1* | 3/2019 | Keil | B05D 1/26 |
| 2019/0267617 A1* | 8/2019 | Evans | H01M 4/0409 |
| 2019/0348644 A1* | 11/2019 | Minamitani | H01M 50/51 |
| 2020/0259165 A1* | 8/2020 | Nishihara | H01M 4/622 |

* cited by examiner

METHOD AND SYSTEM FOR USE OF NITROGEN AS A STABILIZATION GAS OF POLYACRYLONITRILE (PAN)

CROSS-REFERENCE TO RELATED APPLICATIONS/INCORPORATION BY REFERENCE

This application claims priority to U.S. provisional patent application 62/933,034 filed on Nov. 8, 2019, which is hereby incorporated herein by reference in its entirety.

FIELD

Aspects of the present disclosure relate to energy generation and storage. More specifically, certain embodiments of the disclosure relate to a method and system for use of nitrogen as a stabilization gas of polyacrylonitrile (PAN).

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for use of nitrogen as a stabilization gas of polyacrylonitrile, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
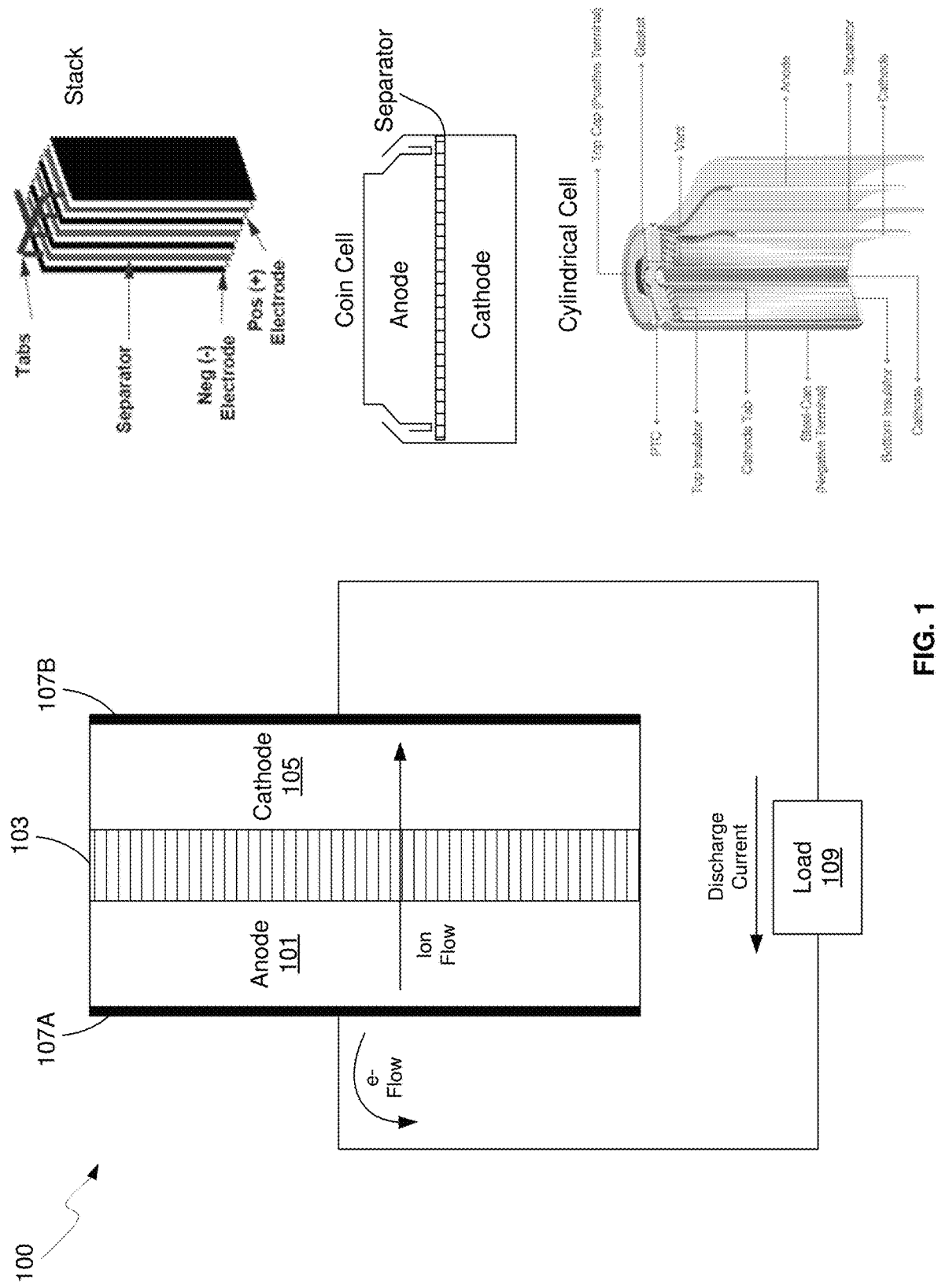
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes. In some examples, where the electrode active material layer is self-supporting, current collectors may be optional.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or electrode coating layer coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the electrode coating layer used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the electrode coating layer for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge. Optionally, conductive particles that may also be electrochemically active are added to the mixture. Such particles can enable both a more electronically conductive composite as well as a more mechanically deformable composite capable of absorbing the large volumetric change incurred during lithiation and de-lithiation. A largest dimension of the conductive particles is between about 10 nanometers and about 100 microns. All, substantially all, or at least some of the conductive particles may comprise the largest dimension described herein. In some implementations, an average or median largest dimension of the conductive particles is between about 10 nm and about 100 microns. The mixture may include greater than 0% and up to about 80% by weight conductive particles. The composite material may include about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys, such as copper, nickel, or stainless steel.

State-of-the-art lithium-ion batteries typically employ a graphite-dominant anode as an intercalation material for lithium. With demand for lithium-ion battery performance improvements such as higher energy density and fast-charging, silicon is being added as an electrode coating layer or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In some embodiments, a largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 95% by weight, between about 50% and about 85% by weight, and between about 75% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

Micron-sized silicon particles can provide good volumetric and gravimetric energy density combined with good cycle life. In certain implementations, to obtain the benefits of both micron-sized silicon particles (e.g., high energy density) and nanometer-sized silicon particles (e.g., good cycle behavior), silicon particles can have an average particle size in the micron range and a surface including nanometer-sized features. The silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

The composite material can be formed by pyrolyzing a polymer precursor, such as PAN. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between silicon particles and the hard carbon.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, a largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

Typical binder material in anodes are polyimide (PI) and polyamide-imide (PAI). An alternative polymer is polyacrylonitrile (PAN), a readily available and cost-effective material. However, PAN needs an oxygen environment for stabilization at elevated temperature (200 to 400° C.) before pyrolysis at temperatures above 500° C., which is detrimental to copper foils often present as the current collector for anodes. In an example scenario, nitrogen may be used as a stabilizing gas for PAN. The nitrogen environment may be provided by flowing nitrogen gas while heating the to a stabilization temperature for a desired time, as shown further with respect to FIG. 4.

Figure 2:
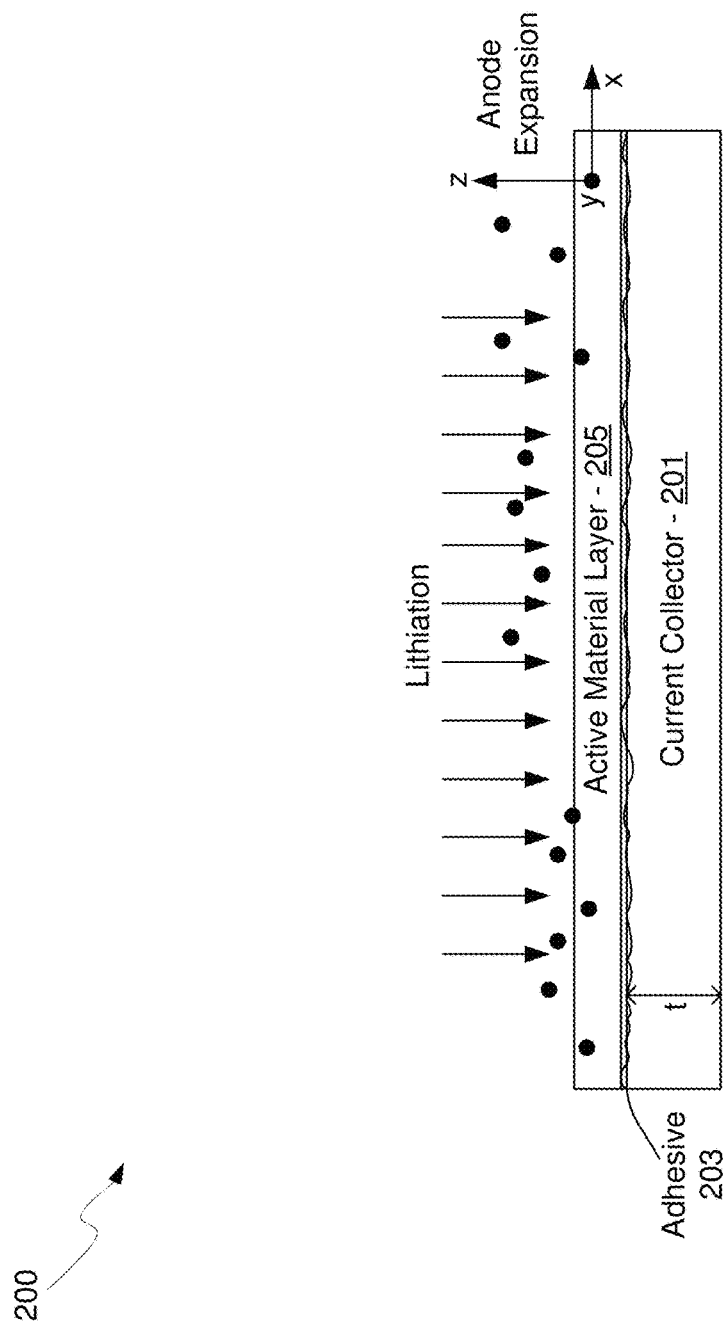
FIG. 2 illustrates an anode during lithiation, in accordance with an example embodiment of the disclosure.

FIG. 2 illustrates an anode during lithiation, in accordance with an example embodiment of the disclosure. Referring to FIG. 2, there are shown a current collector 201, adhesive 203, and an active material layer 205. The active material layer 205 comprises active material, such as silicon and carbon, within a pyrolyzed binder, which in this case may comprise PAN.

It should be noted that the adhesive 203 may or may not be present depending on the type of anode fabrication process utilized, as the adhesive is not present in a direct coating process, and if present may be utilized before or after heat treatment. Furthermore, the layer thicknesses are not necessarily shown to scale, and the adhesive 203 is typically thin enough such that the active material layer 205 makes contact with the current collector 201 in various locations on the surface. In an example scenario, the anode active material layer 205 before pyrolysis comprises silicon particles in a binder material and a solvent, where the active material is pyrolyzed to turn the binder into a pyrolyzed carbon that provides a structural framework around the silicon particles and also provides carbon for electrical conductivity. The active material may be coupled to the current collector 201 using the adhesive 203. The current collector 201 may comprise a metal film, such as copper, nickel, or titanium, for example, although other conductive foils may be utilized depending on desired tensile strength. In a direct coating process, the active material layer 205 is coupled to the metal current collector 201 without adhesive.

FIG. 2 also illustrates lithium ions impinging upon and lithiating the active material 205 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 μm thick, such as 20 μm for copper, for example, while thinner foils may be less than 10 μm, such as 5-6 μm thick for copper.

In an example scenario, the adhesive 203 comprises a polymer such as PI, PAI, PVDF, or PAA that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion. Furthermore, while FIG. 2 shows a single-sided anode, the disclosure is not so limited, as a double-sided anode may be fabricated in this process.

Using PAN as a carbon precursor with the silicon particles in the anode and a nitrogen stabilization gas may improve the structural quality of the anode. As stated above, typical binder material in anodes are PI and PAI, while PAN is a readily available and cost-effective alternative material. However, it needs an oxygen environment for stabilization at elevated temperature (200 to 400° C.) before pyrolysis at temperatures above 500° C., which is detrimental to copper foils, which may be present in direct coated anodes. In an example scenario, nitrogen may be used as a stabilizing gas for PAN.

The amount of Si particles in the active material layer 205 may be between greater than 0% and about 99% by weight, between about 20% and about 80%, between about 30% and about 80%, or between about 40% and about 80%. In some implementations, the amount of Si particles in the composite material may be between about 50% and about 99% by weight, between about 50% and about 96%, between about 60% and about 90%, between about 70% and about 99%; between about 50% and about 80%, or between about 50% and about 70%, or greater than about 50%, and such anode is considered as a Si-dominant anode.

The amount of one or more types of carbon phases in the active material layer 205 from the PAN material binder may be between greater than 0% and less than about 90% by weight, between greater than 0% and less than about 50%, between about 1% and about 50%, between about 1% and about 60%, or between about 1% and about 70% by weight. The pyrolyzed/carbonized PAN can form a substantially continuous conductive carbon phase in the entire electrode as opposed to particulate carbon suspended in a non-conductive binder in one class of conventional lithium-ion battery electrodes.

Figure 3:
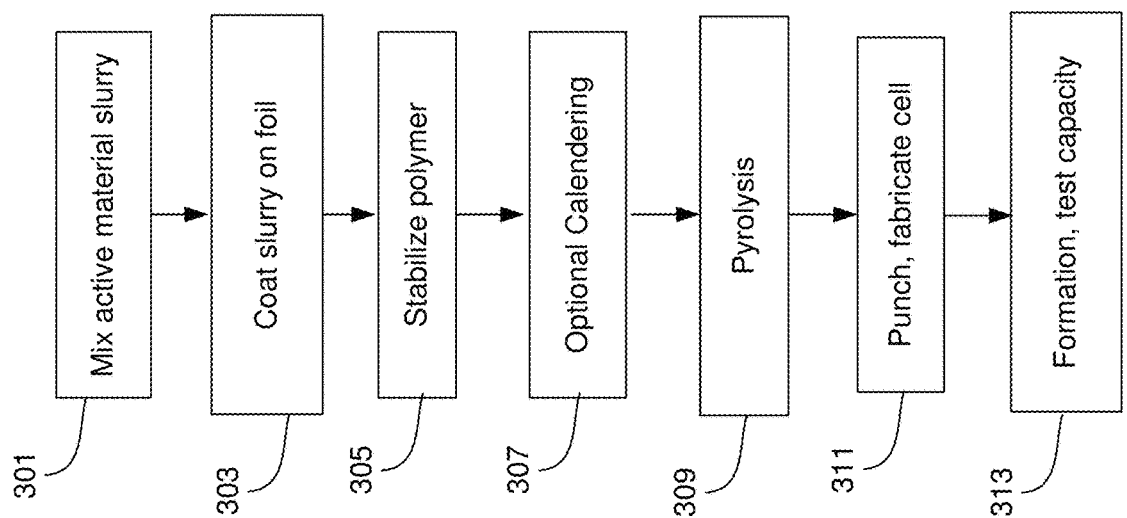
FIG. 3 is a flow diagram of a direct coating process for fabricating a cell, in accordance with an example embodiment of the disclosure.

FIG. 3 is a flow diagram of a direct coating process for fabricating a cell, in accordance with an example embodiment of the disclosure. This process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI and mixtures and combinations thereof.

In step 301, the raw electrode active material may be mixed using PAN as binder/resin, solvent, and conductive carbon. For example, for the anode, graphene and PAN may be dispersed in NMP under sonication for, e.g., 45-75 minutes followed by the addition of Super P (1:1:1 with PAN and graphene) and additional sonication for, e.g., 45-75 minutes. Silicon powder with a desired particle size and impurity level may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-5000 cP and a total solid content of about 30%.

The particle size and mixing times may be varied to configure the active material density and/or roughness. Furthermore, cathode active materials may be mixed in step 301, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 303, the anode or slurry may be coated on a copper foil. Similarly, cathode active materials may be coated on a foil material, such as aluminum, for example. In one embodiment, the foil may comprise perforations through the material to allow flow-through of lithiation during operation of the cell.

The active material layer may undergo a stabilization step in step 305, where nitrogen is used as a stabilization gas, resulting in less than 18% residual solvent content. The use of nitrogen as a stabilization gas for PAN binder in the electrode enables a copper current collector, which would be adversely impacted if stabilized in oxygen, as normally done with PAN. An optional calendering process may be utilized in step 305 where a series of hard pressure rollers may be used to finish the film/substrate into a smoother and denser sheet of material. In another example scenario, the optional calendering process may be performed before stabilization. In step 307, the foil and coating proceeds through a roll press for lamination.

In step 309, the active material may be pyrolyzed by heating to 500-800° C. such that carbon precursors are partially or completely converted into pyrolyzed carbon. For pyrolysis, a thermal gradient between the metal current collector and the active material being pyrolyzed may enable higher temperatures for the active material without adversely affecting the metal foil. This may be enabled by cooling channels near or in contact with the foil while heat or laser sources pyrolyze the active material. Furthermore, cooling channels near or in contact with the foils can speed the cooling process following pyrolysis, which may be a significant time considering the exponential nature of cooling In addition, nitrogen gas may be utilized during pyrolyzation.

The pyrolysis step may result in an anode active material having silicon content greater than or equal to 50% by weight, where the anode has been subjected to heating at or above 400 degrees Celsius. Pyrolysis can be done either in roll form or after punching in step 311. If done in roll form, the punching is done after the pyrolysis process. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed.

Figure 4:
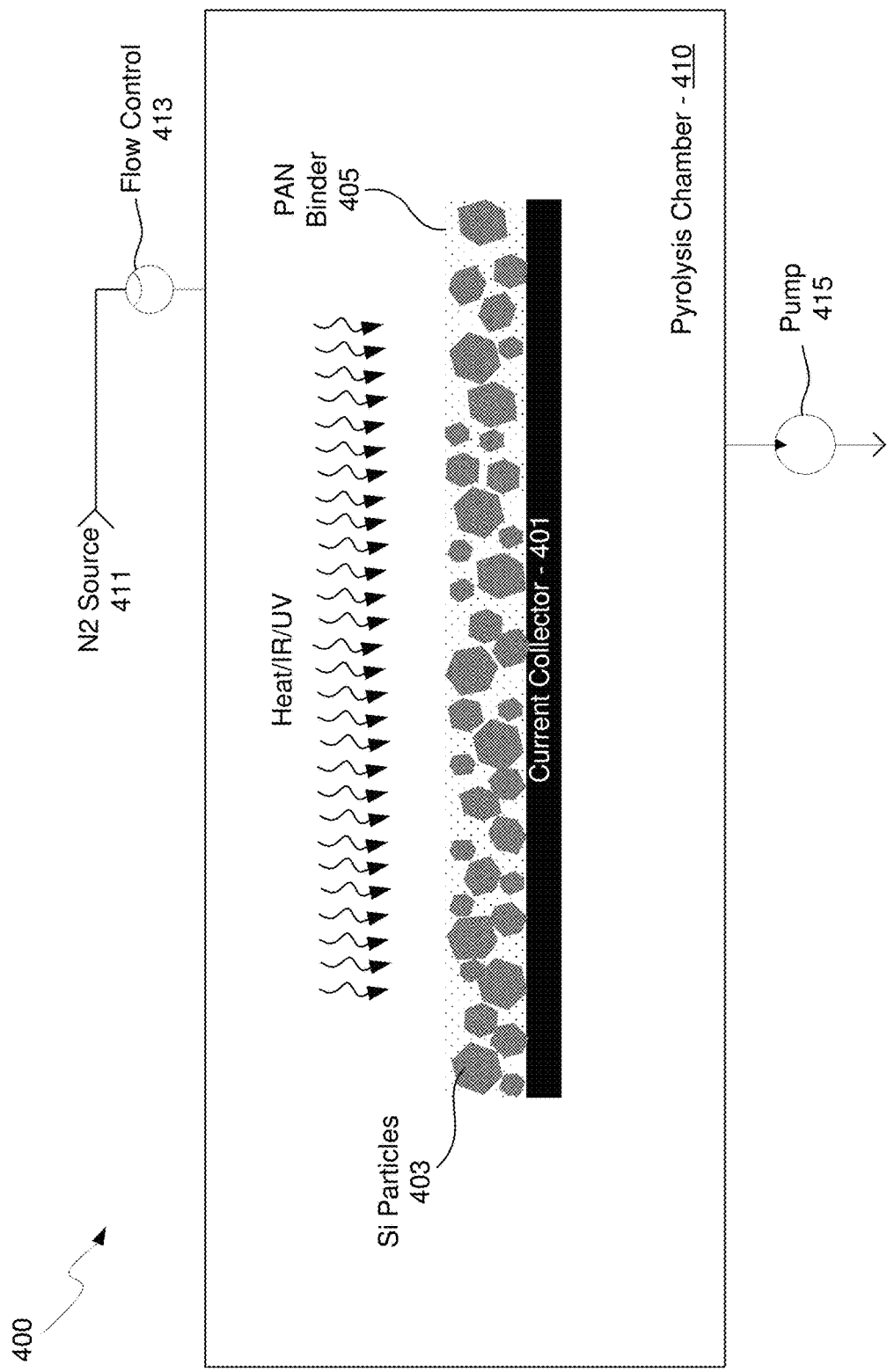
FIG. 4 illustrates stabilization of the polymer in silicon-dominant anodes, in accordance with an example embodiment of the disclosure.

FIG. 4 illustrates stabilization of the polymer in silicon-dominant anodes, in accordance with an example embodiment of the disclosure. Referring to FIG. 4, there is shown polymer stabilization process 400 comprising a stabilization pyrolysis chamber 410 and a current collector 401 with active material comprising silicon particles 403 and binder material 405 formed thereon. The silicon particles 403 and binder material 405 may be as described above, where the figure shows the anode in the polymer stabilization step prior to pyrolysis. While the figure shows only a section of an anode, the process may be for a continuous anode process where an entire anode roll is stabilized.

The stabilization pyrolysis chamber 410 comprises a nitrogen source 411, flow control 413, and a pump 415. The nitrogen source 411 with flow control 413 may control the amount of nitrogen gas in the chamber and the pump 415 may control the pressure, for example, as well as remove any process waste gases. This is in contrast to conventional stabilization of PAN, which utilizes oxygen gas flow. A heating element or optical heating source may be utilized to heat the chamber and/or electrode, where stabilization of the PAN may be in the 100-500 C range, for example. Nitrogen may be beneficial as an inert gas for the polymer as well as silicon in the overall anode structure and also may be used during pyrolysis described with respect to FIG. 3.

Figure 5:
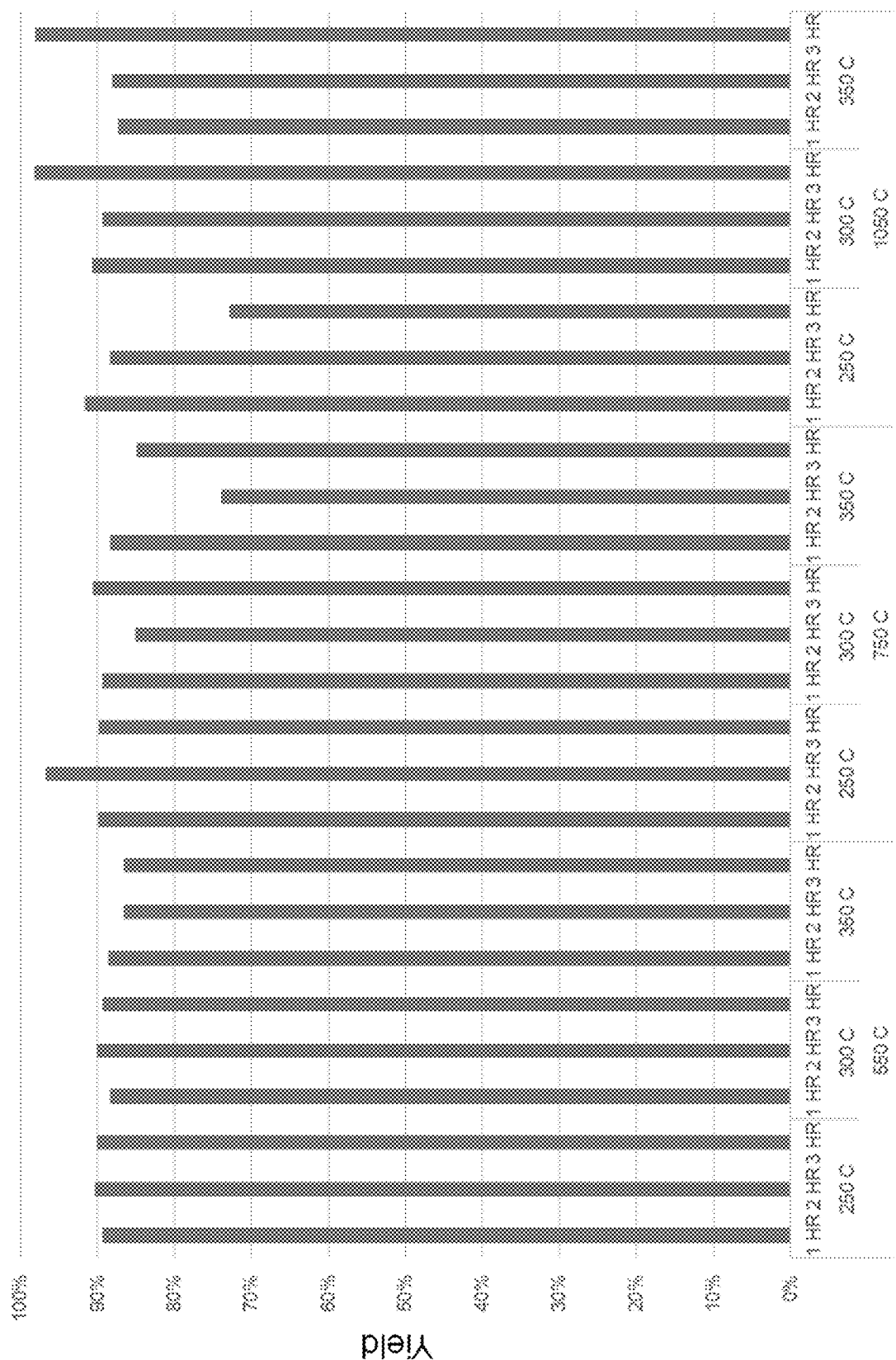
FIG. 5 illustrates PAN stabilization yield with oxygen at various stabilization times and temperatures, in accordance with an example embodiment of the disclosure.

FIG. 5 illustrates PAN stabilization yield with oxygen at various stabilization times and temperatures, in accordance with an example embodiment of the disclosure. Referring to FIG. 5, there is shown stabilization yield for PAN electrode active layers, where the yield is defined as weight of the material after stabilization divided by weight before stabilization. The different stabilization times are 1, 2, and 3 hours, while the stabilization temperatures are 250° C., 300° C., and 350° C. with oxygen flowing into the chamber, as illustrated in FIG. 4. As can be seen from FIG. 5, there is little variability of yield versus stabilization time and temperature ranging from 90% to ~98%. While oxygen is typically used for PAN stabilization, this can adversely impact electrodes when on copper foil, as it oxidizes the metal and degrades electrode performance.

Figure 6:
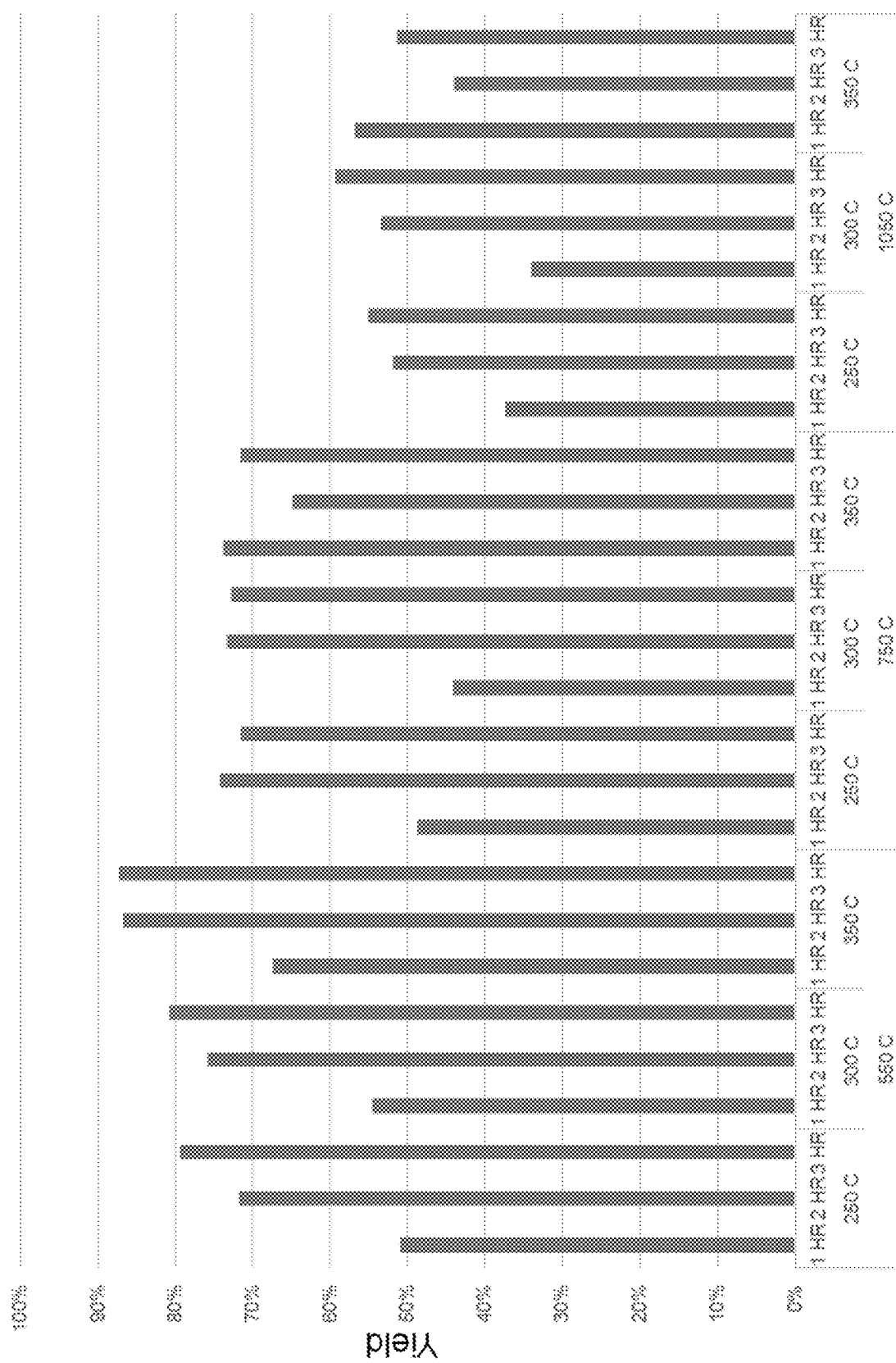
FIG. 6 illustrates PAN pyrolysis yield at various pyrolysis temperatures and stabilization times and temperatures, in accordance with an example embodiment of the disclosure.

FIG. 6 illustrates PAN pyrolysis yield at various pyrolysis temperatures and stabilization times and temperatures, in accordance with an example embodiment of the disclosure. Referring to FIG. 6 there is shown pyrolysis yield, again defined by weight of the material after pyrolysis divided by weight of the material before pyrolysis, for pyrolysis temperatures of 550° C., 750° C., and 1050° C., with the different stabilization conditions of FIG. 5.

The different stabilization times for this example are 1, 2, and 3 hours, while the stabilization temperatures are 250° C., 300° C., and 350° C. with oxygen flowing into the chamber during stabilization and nitrogen or argon flowing during pyrolysis, as illustrated in FIG. 4. In the example of FIG. 6, argon was utilized during pyrolysis. As can be seen from the general trend of the boxplot, the higher pyrolysis temperature of 1050° C. results in lower yield as compared to lower temperatures of 550° C. and 750° C., as expected.

Figure 7:
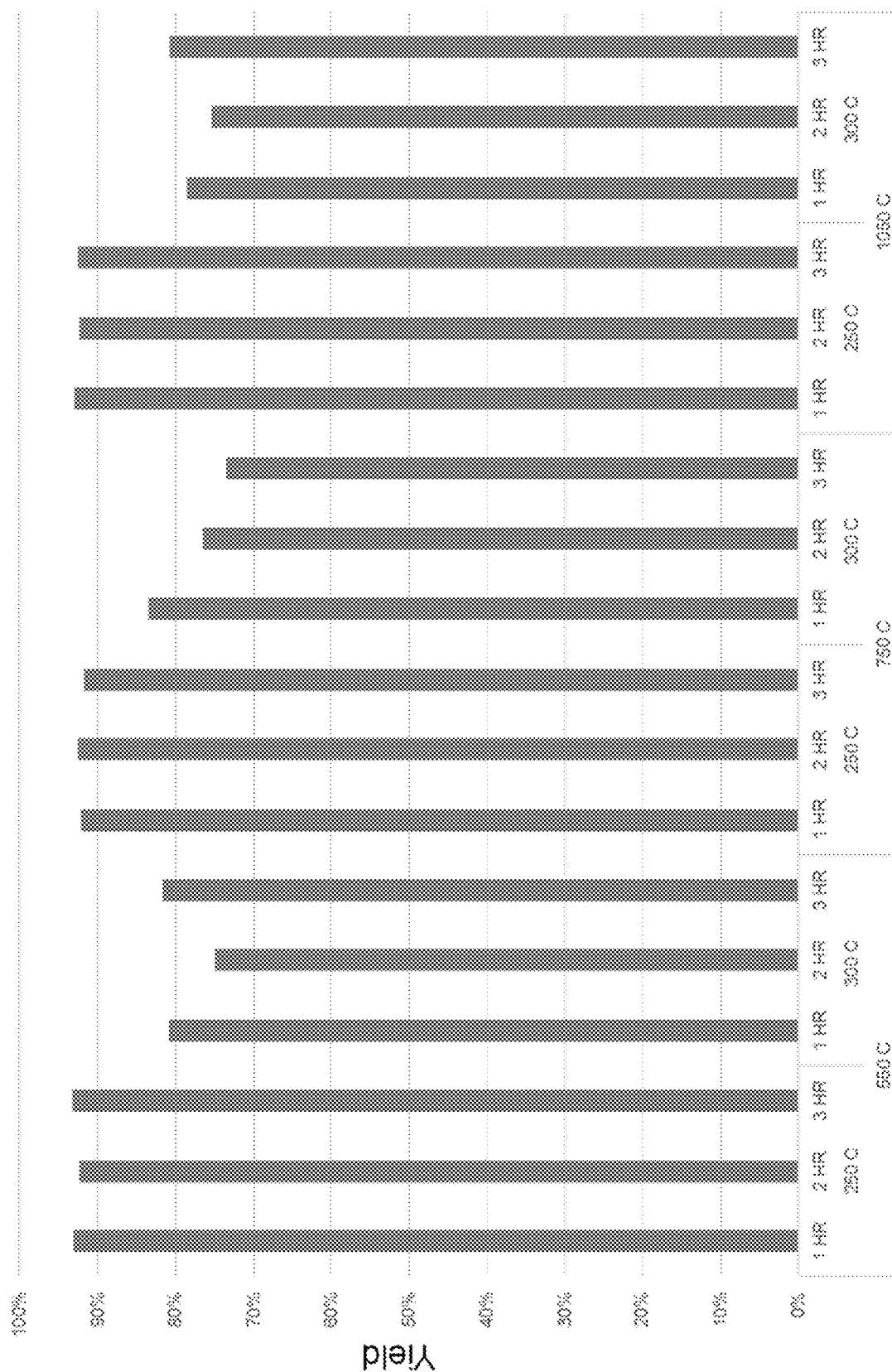
FIG. 7 illustrates PAN stabilization yield with nitrogen, in accordance with an example embodiment of the disclosure.

FIG. 7 illustrates PAN stabilization yield with nitrogen, in accordance with an example embodiment of the disclosure. Referring to FIG. 7, there is shown yield after stabilization using nitrogen gas, as shown in FIG. 4, where the stabilization conditions were temperatures of 250° C., 300° C., and 350° C. for 1, 2, and 3 hours. As shown in the remaining points in the plot, stabilization under N2 gas flow results in typical acceptable yields, indicating the feasibility of PAN stabilization using nitrogen.

Figure 8:
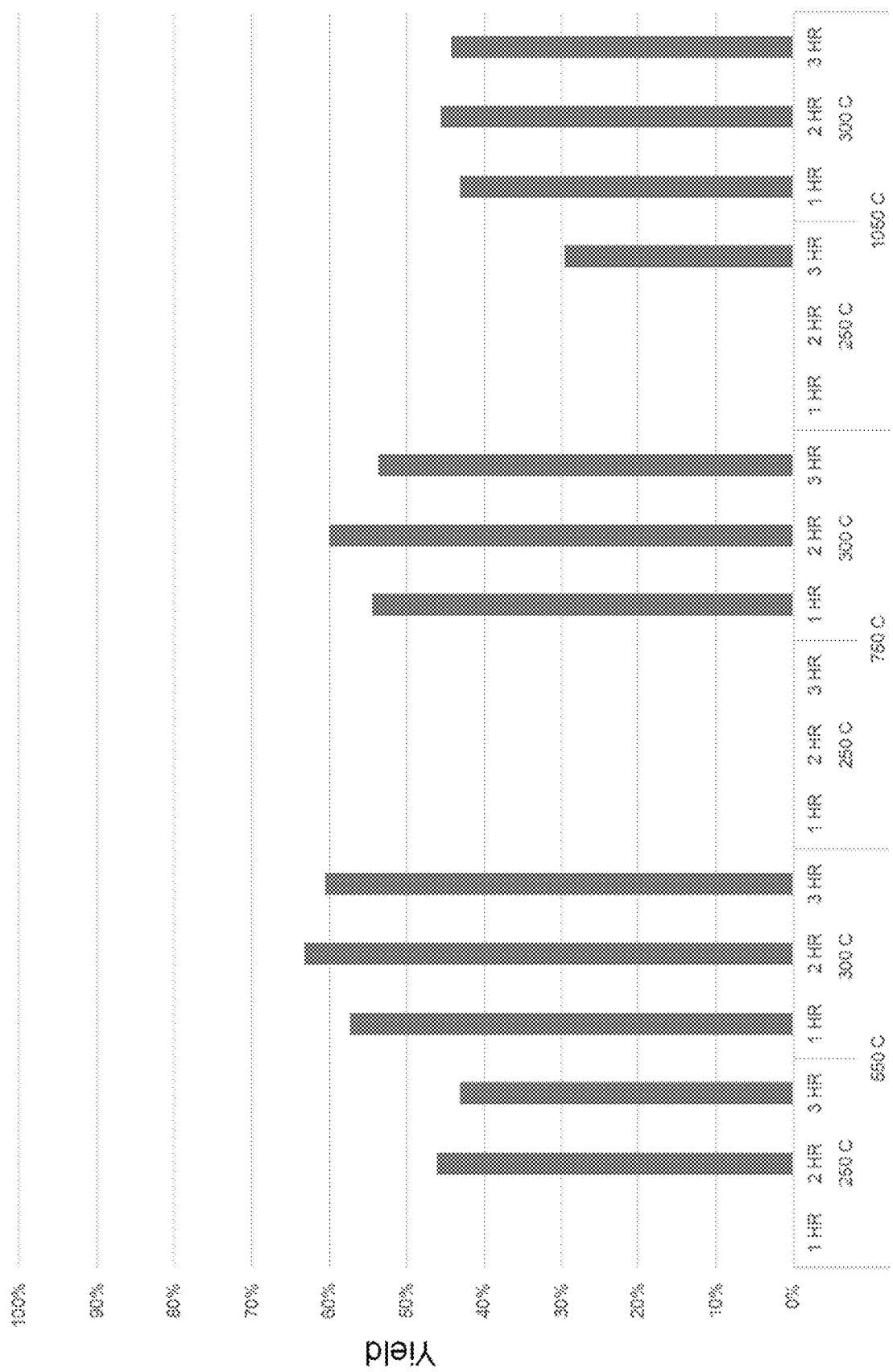
FIG. 8 illustrates PAN pyrolysis yields for various pyrolysis temperatures and stabilization conditions, in accordance with an example embodiment of the disclosure.

FIG. 8 illustrates PAN pyrolysis yields for various pyrolysis temperatures and stabilization conditions, in accordance with an example embodiment of the disclosure. The samples were stabilized using nitrogen gas for 1, 2, or 3 hours at 250° C., 300° C., or 350° C. and pyrolyzed under nitrogen or argon at 750° C., 550° C., or 1050° C. Referring to FIG. 8 the yield following pyrolysis results show that lower yield levels are obtained at higher pyrolysis temperature, as expected, with yields down to 30-45% with 1050° C. pyrolysis.

Figure 9:
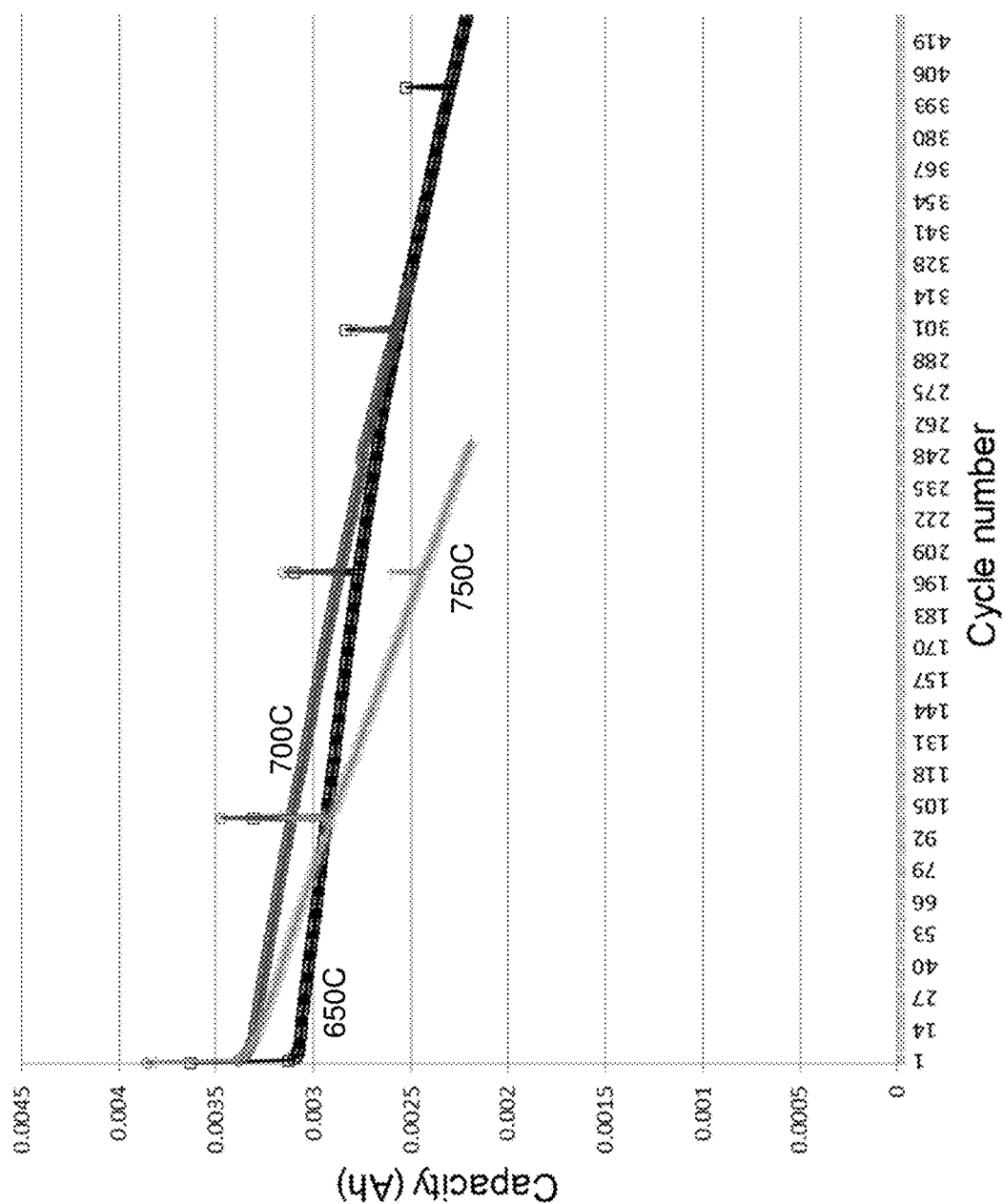
FIG. 9 illustrates coin cell cycling results for nitrogen-stabilized PAN electrodes, in accordance with an example embodiment of the disclosure.

FIG. 9 illustrates coin cell cycling results for nitrogen-stabilized PAN electrodes, in accordance with an example embodiment of the disclosure. The cells were fabricated with PAN binder in the active material layer stabilized under nitrogen at 300° C. for 2 hours and pyrolyzed under nitrogen at 650° C., 700° C., or 750° C. Referring to FIG. 9, the capacity in Amp-hours is shown for three coin cells for over 250-400 cycles, where the 650° C. treated cell retains 22 mAh capacity after more than 400 cycles.

Figure 10:
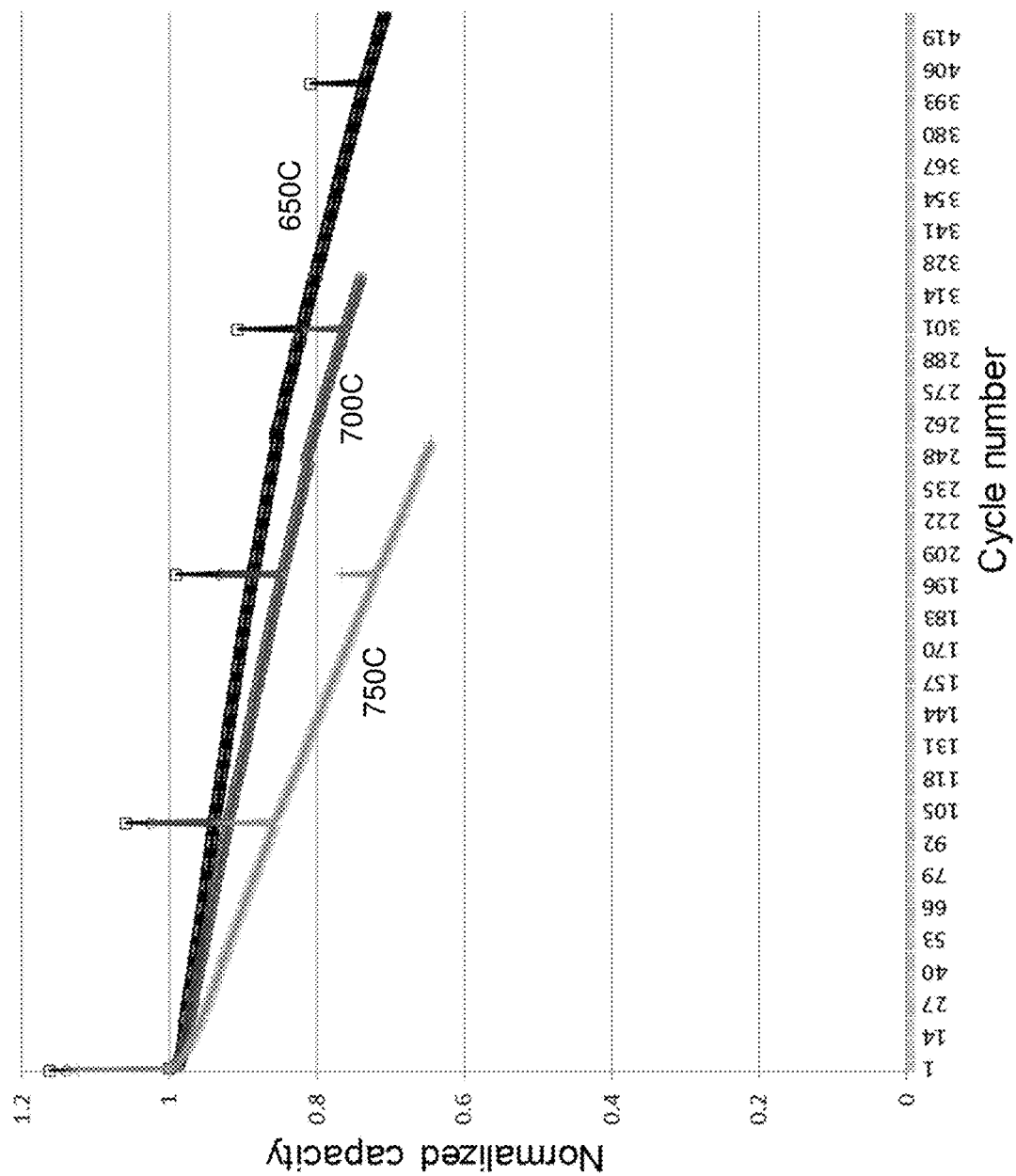
FIG. 10 illustrates normalized capacity curves for nitrogen-stabilized PAN electrodes, in accordance with an example embodiment of the disclosure.

FIG. 10 illustrates normalized capacity curves for nitrogen-stabilized PAN electrodes, in accordance with an example embodiment of the disclosure. The cells were fabricated with PAN binder in the active material layer stabilized under nitrogen at 300° C. for 2 hours and pyrolyzed under nitrogen at 650° C., 700° C., or 750° C. Referring to FIG. 9, the normalized capacity is shown for three coin cells for over 250-400 cycles, where the 650° C. treated cell retains more than 70% capacity after more than 400 cycles. These cell results demonstrate the feasibility of PAN stabilized with nitrogen in silicon-dominant cells.

In an example embodiment of the disclosure, a method and system are described for use of nitrogen as a stabilization gas of polyacrylonitrile and may comprise forming an active material layer comprising silicon particles and polyacrylonitrile (PAN), and heating the active material layer comprising PAN using nitrogen as a stabilization gas. The active material layer may be pyrolyzed at a temperature of 500° C. or more. The active material layer may be pyrolyzed at a temperature of 750° C. or less. The active material layer may be pyrolyzed by heating in a nitrogen gas environment or an argon gas environment. The active material layer may comprise 50% or more silicon by weight. The active layer may be heated at a temperature of 350° C. or more, at a temperature of 300° C. or more, or a temperature of 250° C. or more. A battery comprises the electrode. The active material layer may be on a metal current collector that comprises one or more of: copper, nickel, and aluminum.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for forming an electrode, the method comprising:
   forming an active material layer comprising silicon particles, solvent, and polyacrylonitrile (PAN); and
   heating the active material layer comprising PAN using nitrogen as a stabilization gas, wherein the heating results in stabilization of the PAN and less than 18% residual solvent content by weight.

2. The method according to claim 1, comprising pyrolyzing the active material layer at a temperature of 500° C. or more.

3. The method according to claim 1, comprising pyrolyzing the active material layer at a temperature of 750° C. or less.

4. The method according to claim 1, comprising pyrolyzing the active material layer by heating in a nitrogen gas environment.

5. The method according to claim 1, comprising pyrolyzing the active material layer by heating in an argon gas environment.

6. The method according to claim 1, wherein the active material layer comprises 50% or more silicon by weight.

7. The method according to claim 1, comprising heating the active material layer at a temperature of 350° C. or more.

8. The method according to claim 1, comprising heating the active material layer at a temperature of 300° C. or more.

9. The method according to claim 1, comprising heating the active material layer at a temperature of 250° C. or more.

10. The method according to claim 1, comprising forming a battery that comprises the electrode.

11. The method according to claim 1, comprising forming the active material layer on a metal current collector that comprises one or more of copper, nickel, and aluminum.

12. A method for forming an electrode, the method comprising:
   forming an active material layer slurry comprising silicon particles, solvent, and polyacrylonitrile (PAN);
   placing the active material layer slurry on a metal current collector to form an active material layer on the metal current collector; and
   heating the active material layer comprising PAN using nitrogen as a stabilization gas, wherein the heating results in stabilization of the PAN and less than 18% residual solvent content by weight.

13. The method according to claim 12, comprising pyrolyzing the active material layer at a temperature of 400° C. or more.

14. The method according to claim 12, comprising pyrolyzing the active material layer at a temperature between 400° C. and 500° C.

15. The method according to claim 12, comprising pyrolyzing the active material layer by heating in a nitrogen gas environment.

16. The method according to claim 12, comprising pyrolyzing the active material layer by heating in an argon gas environment.

17. The method according to claim 12, wherein the active material layer comprises 50% or more silicon by weight.

18. The method according to claim 12, comprising heating the active material layer at a temperature of 350° C. or more.

19. The method according to claim 12, comprising heating the active material layer at a temperature of 300° C. or more.

20. The method according to claim 12, comprising heating the active material layer at a temperature of 250° C. or more.

21. The method according to claim 12, comprising forming a battery that comprises the electrode.

* * * * *